HOUSING CONSTRUCTION FOR LIGHT-SENSITIVE DEVICES

Filed April 26, 1961

INVENTOR.
ABRAHAM B. LESHAM
BY
OSTROLENK, FABER, GERB & SOFFEN
ATTORNEYS

United States Patent Office 3,117,296
Patented Jan. 7, 1964

3,117,296
HOUSING CONSTRUCTION FOR LIGHT-SENSITIVE DEVICES

Abraham B. Leshem, Hollywood, Calif., assignor to International Rectifier Corporation, El Segundo, Calif., a corporation of California Filed Apr. 26, 1961, Ser. No. 105,704
5 Claims. (Cl. 338—19)

My invention relates to a novel housing construction for light-sensitive devices, and more specifically relates to a sandwich-type housing for cadmium-sulphide photo-conductive elements coated on mica sheets, and a novel method of manufacture thereof.

Cadmium-sulphide photo-conductive elements are well-known wherein an elongated layer of cadmium-sulphide is coated on a backing such as a mica sheet, and the opposite sides of the layer are provided with conductive surfaces which serve as respective terminals for the device.

The present invention provides a novel housing structure for the individual photo-conductive elements as well as a novel method of manufacture for making a plurality of such elements in a simple and economical manner.

The housing of the nevel structure must have a transparent layer under which the active side of the element is positioned, and it must be resistant to moisture and other atmospheric conditions. Furthermore, the housing must be resistant to considerable shock conditions. All of these conditions are satisfied by the present invention wherein the individual mica sheets having photo-conductive elements coated thereon are arranged in spaced relation with respect to one another and placed between a sandwich of a thin, elongated, transparent, plastic material. The plastic material on either side of the various cells is then caused to be sealed around the periphery of each of the photo-sensitive elements contained within the sandwich by the application of well known plastic laminating devices, and the individual sealed elements are thereafter cut from the sheet to the proper size for the individual cells. Thereafter, appropriate apertures are placed in the individual pre-cut sheets to receive conductive eyelets at the conductive terminal portions of each of the sheets, which eyelets serve as terminals for the individual device in a novel and inexpensive manner which is highly conducive to mass production techniques.

Accordingly, a primary object of this invention is to provide a novel and inexpensive transparent housing for photo-conductive elements.

Another object of this invention is to provide a novel method of manufacture for forming a plurality of light-sensitive devices within respective housings in a novel and inexpensive manner.

A further object of this invention is to provide a novel packaging for flat cadmium-sulphide photo-conductive elements which is highly resistant to moisture and other atmospheric conditions, and is further highly resistant to shock conditions.

A further object of this invention is to provide a novel manner for placing terminals on the opposite ends of a cadmium-sulphide light-sensitive device.

A further object of this invention is to utilize a laminating machine for placing a plurality of spaced photo-sensitive devices within individual encapsulated housings formed by the application of pressure around the sandwich of plastic material surrounding each individual light-sensitive device.

These and other objects of this invention will become apparent from the following description when taken in connection with the drawings, in which.

Figure 1:
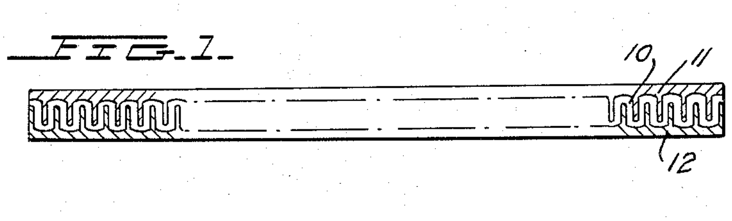
FIGURE 1 shows an elongated sheet of a pre-formed cadmium-sulphide cell.

Referring first to FIGURE 1, the first step in forming the novel structure of the present invention, and in the novel method of the present invention, is to pre-form an elongated cell of the cadmium-sulphide type in the usual manner. By way of example, a silk screening operation could be used to form the pattern on an insulated backing material such as mica. Thus, in FIGURE 1 an elongated sheet of mica which has a length of 6 inches, a width of .550 inch, and a thickness of .002 inch receives an elongated surface area 10 of cadmium-sulphide where the upper portion of the cadmium-sulphide layer 10 lies adjacent a conductive region 11, while the lower edge of the cadmium-sulphide portion 10 lies adjacent a conductive region 12.

Figure 2:
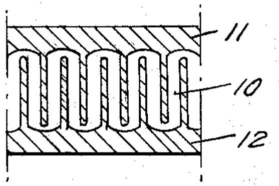
FIGURE 2 shows an individual cadmium-sulphide cell cut to its proper dimensions from the sheet of FIGURE 1.
Figure 3:
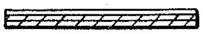
FIGURE 3 is a side cross-sectional view of FIGURE 2.

The sheet of FIGURE 1 is thereafter cut into a plurality of individual cadmium-sulphide cells of the type shown in FIGURES 2 and 3 where the length of each of the individual cells can, for example, be .520 inch, as illustrated in FIGURE 2.

Figure 4:
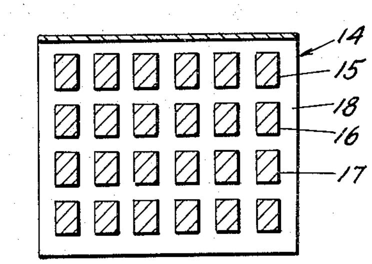
FIGURE 4 shows a top view of a plurality of cadmium-sulphide cells of the type shown in FIGURES 2 and 3 as mounted on a plastic surface.
Figure 5:
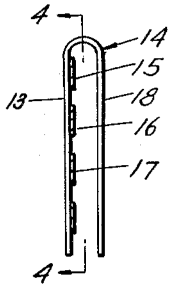
FIGURE 5 is a side view of FIGURE 4 and shows the individual cells of FIGURE 2, as mounted on one surface of a plastic sandwich defined by a U-shaped transparent, plastic member prior to the sealing operation.

After the pre-formed elements have been cut to size, as shown in FIGURES 2 and 3, they are laid in predetermined spaced relationship with respect to one another on the bottom flap 13 of plastic envelope 14, shown in FIGURES 4 and 5, their distribution being particularly illustrated in FIGURE 4 for the case of individual cells such as cells 15, 16 and 17. By way of example, the distance between adjacent cells can be .200 inch. The plastic envelope 14 can, for example, have a thickness of the order of 0.020″, and is of a transparent material which is capable of being sealed to itself in any well known laminating machine of a type presently well known, for example, in the sealing of identification cards and the like. If desired, the bottom surface of the mica sheet could be caused to be adhesive so that once the individual cells are placed on the sheet, they are rigidly retained thereon and will not slip during the sealing process.

The upper flap 18 of the plastic envelope 14 is thereafter turned down and across the upper surface of the various cells such as cells 15, 16 and 17, and by the placement of appropriate dies, or the like, the two sides 13 and 18 of the plastic are caused to seal together around the periphery of each of the individual cells, such as cells 15, 16 and 17. This will, of course, form a hermetic seal about each of the elements which is transparent and is resistant to moisture and shock conditions.

Figure 6:
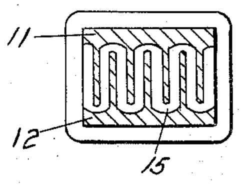
FIGURE 6 shows a completed cell after the laminating process has been performed in FIGURE 5 and the cell has been cut from the sheet.
Figure 7:
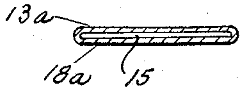
FIGURE 7 shows a side cross-sectional view of FIGURE 6.

Thereafter, the individual cells are cut from the sheet of FIGURE 4, as shown in FIGURES 6 and 7, so that a sealed rim of the order of, for example, .080 inch exists around the periphery of the cell, such as cell 15 illustrated in FIGURES 6 and 7.

The cutting process by which the individual cells are cut from the assembly of FIGURE 4 can be accomplished in any desired manner as by punching with a unitary die means which will, at one and the same time, punch all of the individual cells from the sheet. Moreover, it will be apparent that the cells can have any configuration other than the rectangular configuration shown in FIGURE 6 such as a square shape or round shape.

Figure 8:
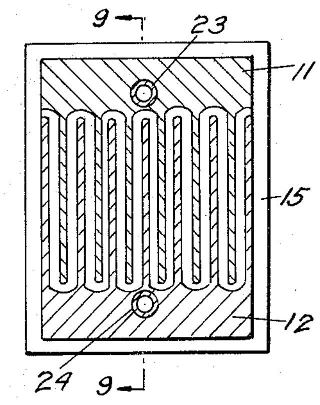
FIGURE 8 shows a top view of the cell of FIGURE 6 after eyelet-type terminal openings have been placed in the plastic.
Figure 9:
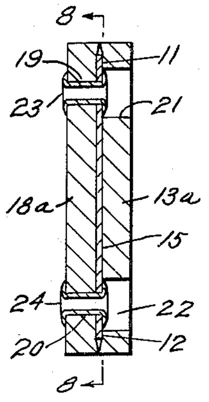
FIGURE 9 shows a side cross-sectional view of FIGURE 8 taken across the lines 9—9 in FIGURE 8, and illustrates the manner in which the eyelets are connected to serve as terminals for the device.

In order to expose terminals 11 and 12 for electrical connection, as shown in FIGURES 8 and 9, two relatively small openings 19 and 20 are punched through the sheet. The holes 19 and 20 can, for example, have a diameter of .062 inch, and could, if desired, have been punched while the individual element was assembled within the plastic folder 14 of FIGURE 5. Thereafter, larger openings 21 and 22 are punched into the lower surface 13*a* which was derived from lower flap 13 of folder 14, and are concentrated with openings 19 and 20. The diameter of openings 21 and 22 can, for example, be .105 inch in diameter. The openings 21 and 22 can be made by drilling or by appropriate punching, and expose an annular area of the conductive surfaces 11 and 12 for openings 21 and 22 respectively.

Figure 10:
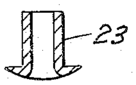
FIGURE 10 is a side cross-sectional view of the eyelets of FIGURES 8 and 9.

Thereafter, a circular conductive eyelet having a cross-section as shown in FIGURE 10 is inserted through the small openings 19 and 20, and extends beyond the upper surface of cell 15. An appropriate tool means is then applied to the upper ends of the eyelets 23 and 24 to peen their upper ends over and into contact with the conductive surfaces 11 and 12 respectively. This will place the eyelets 23 and 24 into electrical connection with surfaces 11 and 12 respectively, and will also mechanically secure the eyelets to the cell.

In making electrical connection to the cell 15, as described in FIGURES 8, 9, and 10, all of the operations are performed after the cell has been cut from the sheet of FIGURE 4. However, it will be understood that all of these operations can be performed prior to the time at which the cells are cut from the sheet, whereby unitary die means can be used to operate on the twenty-four individual cells at one and the same time. Thus, handling procedures will be substantially simplified when the devices are handled prior to the cutting operation.

Although I have described preferred embodiments of my novel invention, many variations and modifications will now be obvious to those skilled in the art, and I prefer, therefore, to be limited not by the specific disclosure herein but only by the appended claims.

I claim:

1. A housing for a photoconductive element; said housing comprising a first and a second sheet having said element interposed therebetween; said first and second sheet being characterized by being sealable to one another; the peripheries of said first and second sheets extending beyond said element and being sealed to one another; said first sheet being adjacent the photosensitive surface of said element; said first sheet being transparent to incident radiation on said photosensitive surface.

2. A housing for a photoconductive element; said housing comprising a first and a second sheet having said element interposed therebetween; said first and second sheet being characterized by being sealable to one another; the peripheries of said first and second sheets extending beyond said element and being sealed to one another; said first and second sheets being transparent.

3. The method of hermetically sealing a plurality of photoconductive elements; said method comprising the steps of positioning a plurality of said elements in spaced relation with respect to one another on the surface of a first sheet of transparent material, covering said first sheet with a second sheet of material sealable to said first sheet, sealing said first sheet to said second sheet around the peripheries of said individual elements, and cutting said sealed first and second sheet about the sealed peripheries of said individual elements.

4. The method of hermetically sealing a plurality of photoconductive elements; said method comprising the steps of positioning a plurality of said elements in spaced relation with respect to one another on the surface of a first sheet of transparent material and securing said elements in position by an adhesive, covering said first sheet with a second sheet of material sealable to said first sheet, sealing said first sheet to said second sheet around the peripheries of said individual elements, and cutting said sealed first and second sheet about the sealed peripheries of said individual elements.

5. The method of hermetically sealing a plurality of photoconductive elements; said method comprising the steps of positioning a plurality of said elements in spaced relation with respect to one another on the surface of a first sheet of transparent material, covering said first sheet with a second sheet of material sealable to said first sheet, and defined by a flap carried from said first sheet of material, sealing said first sheet to said second sheet around the peripheries of said individual elements, and cutting said sealed first and second sheet about the sealed peripheries of said individual elements.

References Cited in the file of this patent

UNITED STATES PATENTS

| | | |
|---|---|---|
| 1,389,312 | Lightfoot | Aug. 30, 1921 |
| 1,942,958 | Carpenter | Jan. 9, 1934 |
| 2,692,321 | Hicks | Oct. 19, 1954 |
| 2,706,791 | Jacobs et al. | Apr. 19, 1955 |
| 2,728,834 | Moleman | Dec. 27, 1955 |
| 2,792,447 | Kazan | May 14, 1957 |